(12) United States Patent
Zhou et al.

(10) Patent No.: US 9,013,643 B2
(45) Date of Patent: Apr. 21, 2015

(54) TOUCH PANEL AND TOUCH DISPLAY DEVICE

(71) Applicant: Shanghai Tianma Micro-Electronics Co., Ltd., Shanghai (CN)

(72) Inventors: Xingyao Zhou, Shanghai (CN); Hao Chen, Shanghai (CN); Jun Ma, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 2 days.

(21) Appl. No.: 14/085,648

(22) Filed: Nov. 20, 2013

(65) Prior Publication Data

US 2014/0184945 A1   Jul. 3, 2014

(30) Foreign Application Priority Data

Dec. 31, 2012   (CN) .......................... 2012 1 0594389

(51) Int. Cl.
| | |
|---|---|
| *G02F 1/1335* | (2006.01) |
| *G02F 1/1333* | (2006.01) |
| *G06F 3/041* | (2006.01) |
| *G06F 3/044* | (2006.01) |

(52) U.S. Cl.
CPC ...... *G02F 1/133514* (2013.01); *G02F 1/13338* (2013.01); *G06F 3/0412* (2013.01); *G06F 3/044* (2013.01)

(58) Field of Classification Search
CPC ........................... G02F 1/13338; G06F 3/0412
See application file for complete search history.

*Primary Examiner* — Phu Vu

(74) *Attorney, Agent, or Firm* — Kilpatrick Townsend & Stockton LLP (57) ABSTRACT

The present invention provides a touch panel and a touch display device, the touch panel includes: a transparent substrate; a conductive layer disposed on the transparent substrate, where the conductive layer includes a plurality of first conductive patterns and a plurality of second conductive patterns intersecting with the plurality of first conductive patterns, and each of the second conductive patterns is separated into multiple segments by the plurality of first conductive patterns; a color resistance insulating layer disposed on the conductive layer, where the color resistance insulating layer includes a plurality of through-holes; and a metal bridging layer disposed on the color resistance insulating layer, where the multiple segments of the second conductive pattern are connected together by the metal bridging layer via the through-holes. With the technical solutions of the present invention, the color resistor is used as the insulating layer to replace the existing organic film layer, thus avoiding the undesirable risk brought about by the manufacturing process for coating the organic film, simplifying the manufacturing process and reducing the production costs.

15 Claims, 10 Drawing Sheets

TOUCH PANEL AND TOUCH DISPLAY DEVICE

CROSS-REFERENCES TO RELATED APPLICATIONS

This application claims the benefit of priority to Chinese Patent Application No. 201210594389.8, filed on Dec. 31, 2012 the contents of which is incorporated herein by reference in its entirety.

TECHNICAL FIELD

The present invention relates to the field of touch display technologies, and more particularly to a touch panel and a touch display device.

BACKGROUND OF THE INVENTION

Figure 1:
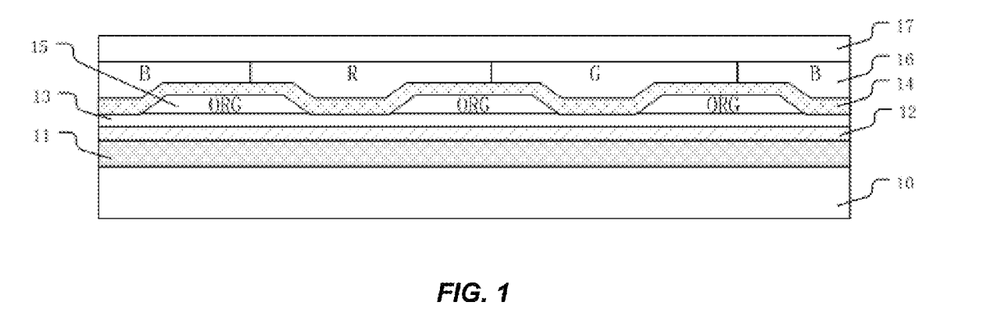
FIG. 1 is a cross-sectional view of an existing touch panel.

FIG. 1 shows the structure of an existing capacitive touch panel, which includes a transparent substrate 10, a black matrix layer 11, a metal layer 12, an Indium Tin Oxide (ITO) layer 13, an organic insulating layer 15, a metal bridging layer 14, a color resistance insulating layer 16 and a protective layer 17. The ITO layer 13 is used to form sensing electrodes and driving electrodes, the metal layer 12 is laminated to an edge of the ITO layer 13, the organic insulating layer 15 insulates the sensing electrodes from the driving electrodes, and the organic insulating layer 15 is formed with holes, through which the metal bridging layer 14 can be bridged to the ITO layer 13, in order to connect the disconnected sensing electrodes or the disconnected driving electrodes. The insulating layer of the above capacitive touch panel is formed by an organic film. In the manufacturing process, however, the coating process for the organic film is relatively difficult and apt to reduce the product yield, thus it's needful to simplify the manufacturing process and improve the product yield.

BRIEF SUMMARY OF THE INVENTION

Accordingly, an object of the present invention is to provide a touch panel and a touch display device.

To achieve the object, embodiments of the present invention provides the following technical solutions.

A touch panel includes:

a transparent substrate;

a conductive layer disposed on the transparent substrate, where the conductive layer includes a plurality of first conductive patterns and a plurality of second conductive patterns intersecting with the plurality of first conductive patterns, and each of the second conductive patterns is separated into multiple segments by the plurality of first conductive patterns;

a color resistance insulating layer disposed on the conductive layer, where the color resistance insulating layer includes a plurality of through-holes; and a metal bridging layer disposed on the color resistance insulating layer, where the multiple segments of the second conductive pattern are connected together by the metal bridging layer via the through-holes.

Embodiments of the present invention further provide a touch display device, the touch display device includes:

a TFT array substrate; and a touch panel according to the aforementioned disposed opposite to the TFT array substrate.

DETAILED DESCRIPTION OF THE PREFERRED EMBODIMENTS

The technical solutions of the present invention will be further described in combination with the appended drawings through the following specific embodiments.

Figure 2A:
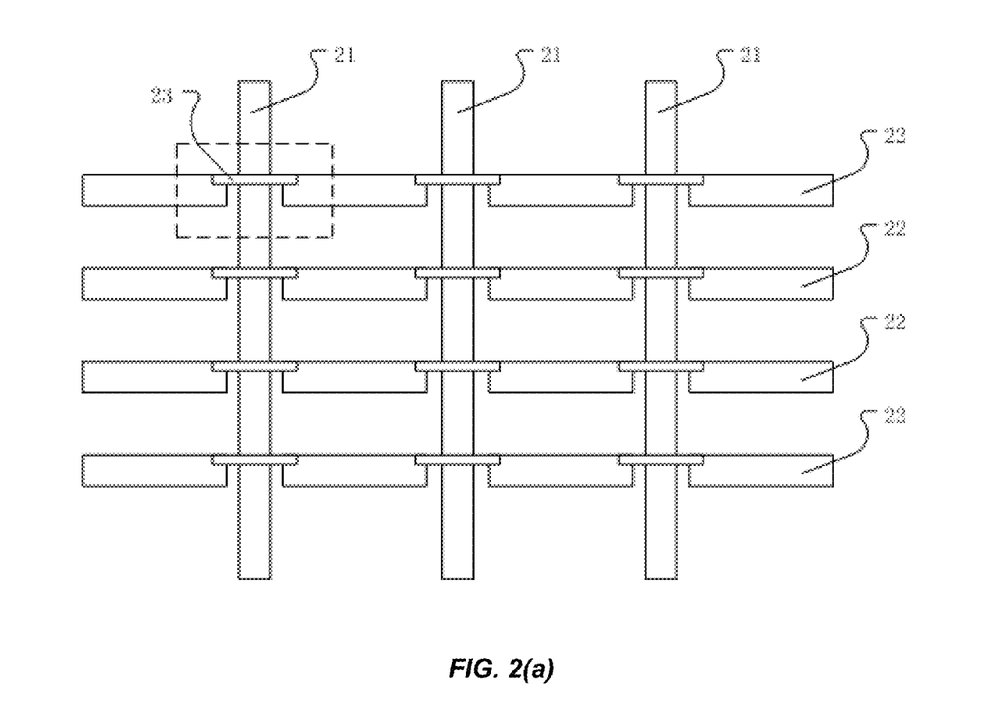
FIG. 2(a) is a schematic top view of a touch panel according to a first embodiment of the present invention.

A touch panel according to the embodiments of the present invention includes a conductive layer disposed on a transparent substrate. As shown in FIG. 2(a), the conductive layer includes a plurality of first conductive patterns 21 and a plurality of second conductive patterns 22 intersecting with the plurality of first conductive patterns 21, each of the second conductive patterns 22 is separated into multiple segments by the plurality of first conductive patterns 21, and the separated multiple segments of the second conductive pattern are connected together with each other through a metal bridging layer 23. In the touch panel, a bridging portion of each of the second conductive patterns 22, namely the intersection portion of the second conductive pattern 22 and the first conductive pattern 21, is used as a touch unit, as shown in the region surrounded by the dotted line in FIG. 2(a). The touch panel includes a plurality of the touch units, and a schematic partial view of the touch unit is showed in FIG. 2(b).

A First Embodiment

Figure 2B:
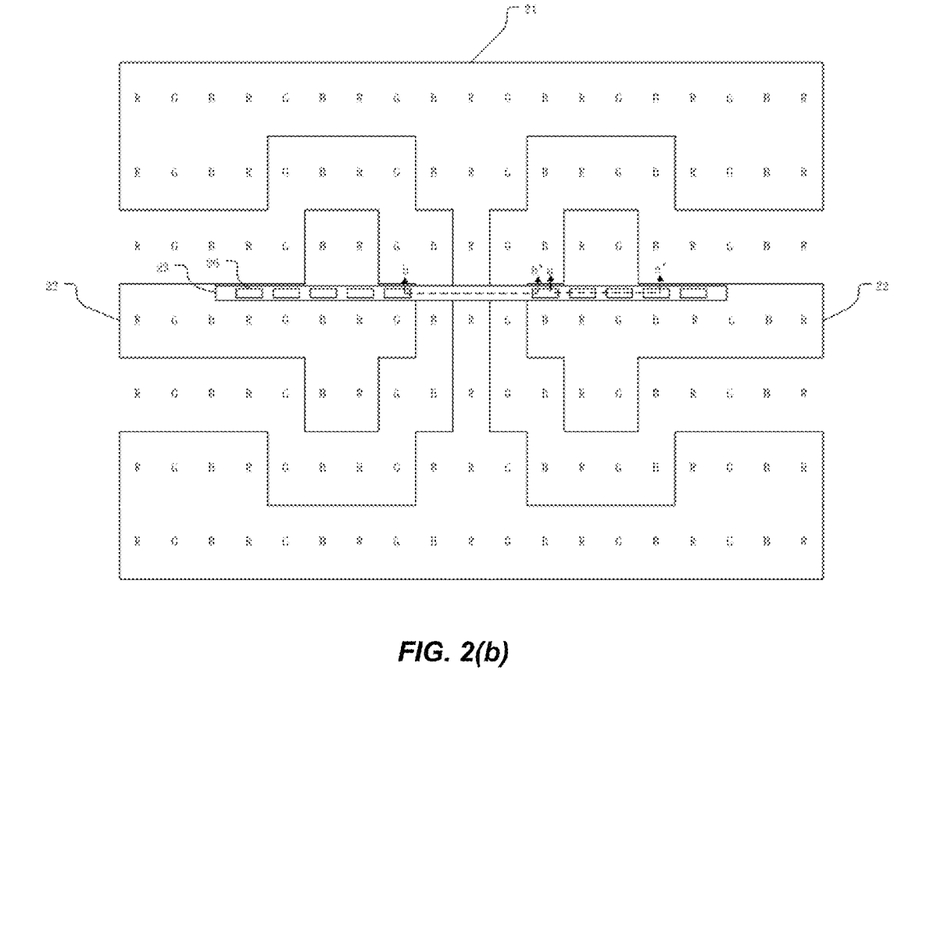
FIG. 2(b) is an enlarged schematic view of a touch unit shown in FIG. 2(a)

FIG. 2(b) is a schematic top view of a certain touch unit in the touch panel according to a first embodiment of the present invention, and the touch unit includes a conductive layer disposed on a transparent substrate, where the conductive layer includes a first conductive pattern 21 and a second conductive pattern 22 arranged in the same layer with the first conductive pattern 21, and the first conductive pattern 21 intersects with the second conductive pattern 22. A color resistance insulating layer is disposed on the conductive layer after disposing the first conductive pattern 21 and the second conductive pattern 22. Generally, the color resistance insulating layer is formed by an array of RGB three-color color resistor units, in another way, formed by an array of black-white or RGBW color resistor units may be feasible, it is not construed as limitation of the present invention. The first conductive pattern 21 is used as a driving electrode of the touch unit and the second conductive pattern 22 is used as a sensing electrode of the touch unit, where the disconnected sensing electrodes need to be connected together through a metal bridging layer 23, and the color resistance insulating layer needs to be disposed in a metal bridging region. The color resistance insulating layer in the metal bridging region, which is used to insulate the metal bridging layer 23 from the first conductive pattern 21, may be individually disposed between color resistor units in the color resistor unit array, or be simultaneously disposed when the color resistor unit array is disposed.

The color resistance insulating layer in the metal bridging region is etched to form through-holes 26. A strip-like metal bridging layer 23 is disposed on the color resistance insulating layer in the metal bridging region along the through-holes 26, and the metal bridging layer 23 contacts with the second conductive pattern 22 via the through-holes 26, so that the second conductive patterns 22 located at both sides of the first conductive pattern 21 are connected with each other. If one through-hole 26 is respectively etched in the color resistance insulating layer at the metal bridging region of the second conductive pattern 22 located at both sides of the first conductive pattern 21, thus the second conductive patterns 22 respectively located at two sides of the first conductive pattern 21 may be connect together through the metal bridging layer 23; alternatively, a plurality of through-holes 26 may be etched so that a number of contacts are disposed between the metal bridging layer 23 and the second conductive patterns 22 to ensure the reliability of the bridging, as shown in FIG. 2(b).

Figure 2C:
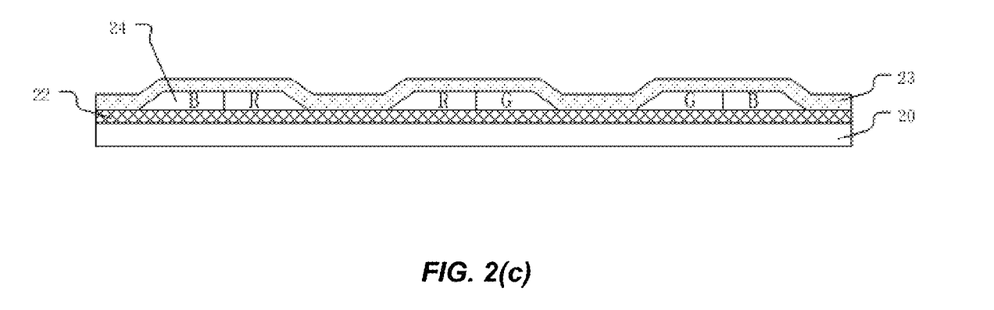
FIG. 2(c) is a cross-sectional view of the touch unit along a line a-a' in FIG. 2(b)
Figure 2D:
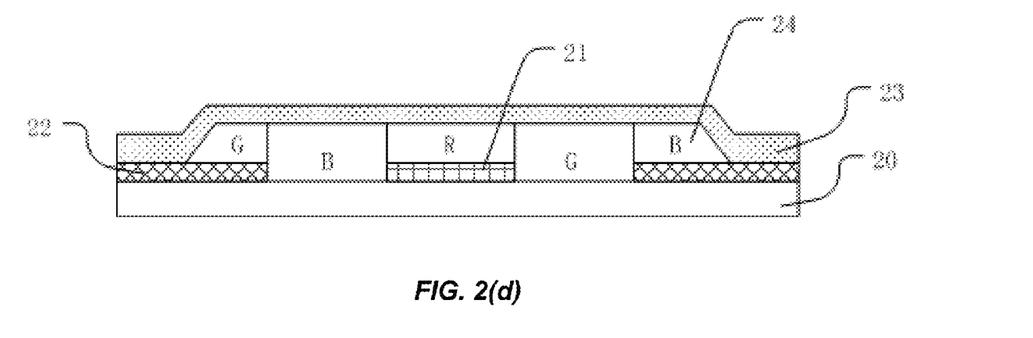
FIG. 2(d) is a cross-sectional view of the touch unit along a line b-b' in FIG. 2(b)

FIG. 2(c) is a cross-sectional view of the touch unit along a line a-a' in FIG. 2(b), and the touch unit includes a transparent substrate 20; a conductive layer disposed on the transparent substrate 20, and the conductive layer may be a second conductive pattern 22 formed along the line a-a' in FIG. 2(b); a color resistance insulating layer 24 disposed on the conductive layer, where the color resistance insulating layer 24 is etched to form a plurality of through-holes to expose the second conductive pattern 22 of the conductive layer; and a metal bridging layer 23 disposed on the color resistance insulating layer 24, where the metal bridging layer 23 is contacted with the second conductive pattern 22 of the conductive layer via the through-holes. FIG. 2(d) is a cross-sectional view of the touch unit along a line b-b' in FIG. 2(b), and the touch unit includes a transparent substrate 20 and a conductive layer disposed on the transparent substrate, where a first conductive pattern 21 and a second conductive pattern 22 are formed along the line b-b' at the conductive layer, the second conductive pattern 22 is separated by the first conductive pattern 21 into two segments which are connected through a metal bridging layer 23, and a color resistor 24 in a metal bridging region insulates the metal bridging layer 23 from the first conductive pattern 21. The conductive layer may be made of Indium Tin Oxide (ITO) or Indium Zinc Oxide (IZO).

It should be noted that the color resistance insulating layer in the metal bridging region is not limited to the constitution form of the color resistor unit as shown in FIGS. 2(c) and 2(d), but may consist of one or more color resistor units, and the color of the color resistor unit may also be selected according to different applications.

In the present embodiment, the first conductive pattern 21 functions as a driving electrode of the touch panel, and the second conductive pattern 22 functions as a sensing electrode of the touch panel. Similarly, when the first conductive pattern 21 is used as the sensing electrode and the second conductive pattern 22 is used as the disconnected driving electrode in the touch unit, the driving electrodes at both sides of the sensing electrode can also be bridged together by means of the above manner.

The thickness of the color resistance insulating layer 24 may range from 1 nm to 4 nm, and 2.2 nm is preferable, and the dielectric constant of the color resistance insulating layer 24 may range from 2 to 4.5, and 3.5 is preferable. By employing the color resistance insulating layer 24 to replace the organic film in the prior art for insulating the sensing electrode from the driving electrode, the manufacturing process for coating the organic film can be eliminated, thus improve the product yield.

Figure 2E:
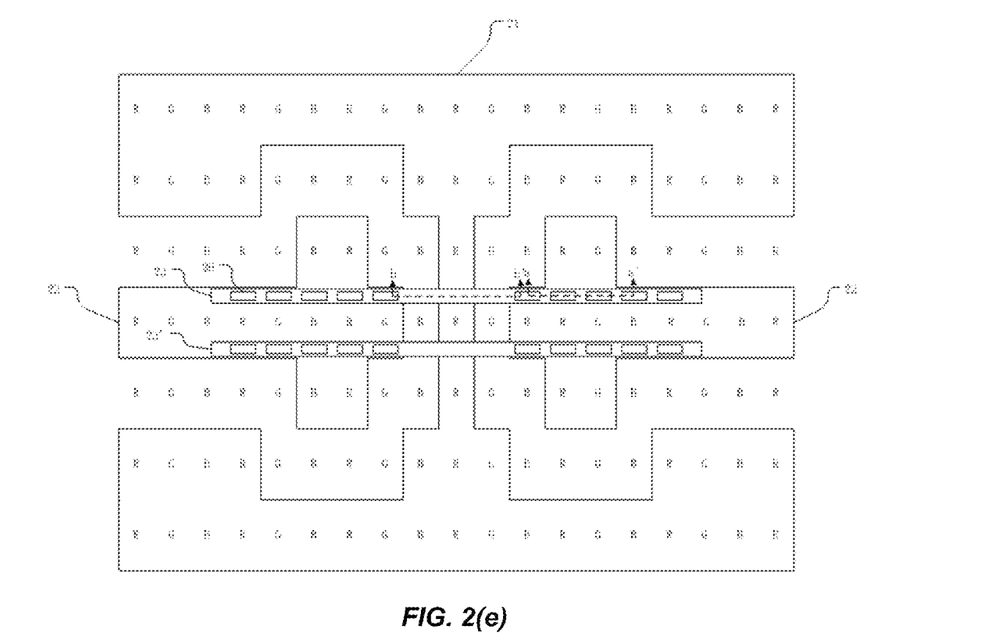
FIG. 2(e) is an enlarged schematic view of a preferred touch unit according to the first embodiment of the present invention.

A preferred implementation of the present embodiment provides a touch unit as shown in FIG. 2(e), where a metal bridging layer 23' is provided additionally based on the touch unit shown in FIG. 2(b). The additional bridging layer 23' may be formed in a manner the same as that of the previous metal bridging layer 23, and is mainly used as a backup with the previous metal bridging layer 23 mutually in order to improve the reliability of the touch unit.

Figure 2F:
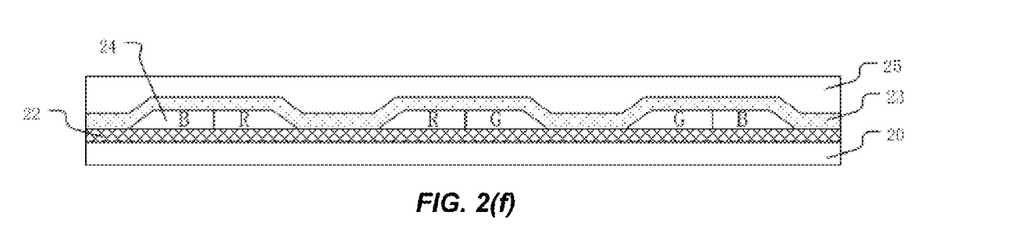
FIG. 2(f) is a cross-sectional view of the touch unit along the line a-a' in FIG. 2(b) or FIG. 2(e) after the planarization of the touch unit.
Figure 2G:
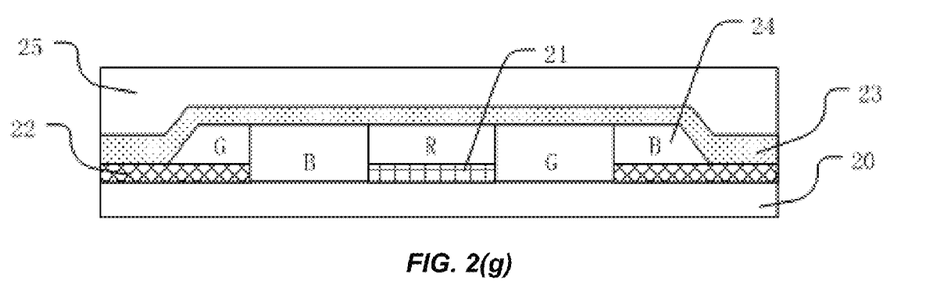
FIG. 2(g) is a cross-sectional view of the touch unit along the line b-b' in FIG. 2(b) or FIG. 2(e) after the planarization of the touch unit.

Generally, when the touch panel is in use, a planarization layer needs to be disposed on each touch unit as shown in FIG. 2(a) or FIG. 2(e). FIGS. 2(f) and 2(g) are cross-sectional views of the touch unit along the lines a-a' and b-b' after the planarization layer is disposed, respectively. The surface of the color resistance insulating layer, on which the strip-like metal bridging layer is formed, is planarized by means of the planarization layer 25 as shown. The planarization layer is made of polyester organic compound, therefore the planarization layer may planarize and provide dielectric protection for the internal composition of the touch panel.

Figure 2H:
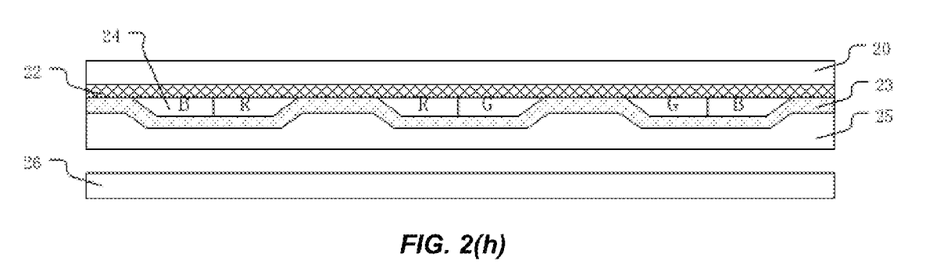
FIG. 2(h) is a cross-sectional view of the touch unit along the line a-a' in FIG. 2(b) or FIG. 2(e) after the touch unit is integrated into an in-cell touch display device.
Figure 2I:
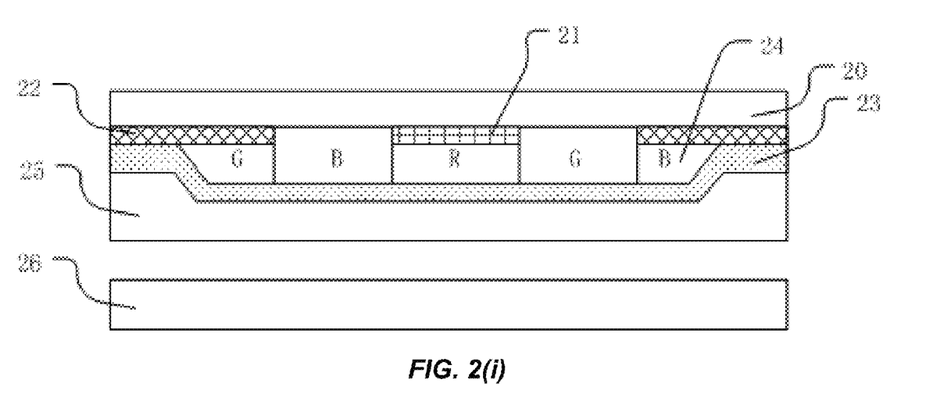
FIG. 2(i) is a cross-sectional view of the touch unit along the line b-b' in FIG. 2(b) or FIG. 2(e) after the touch unit is integrated into an in-cell touch display device.

FIGS. 2(h) and 2(i) are cross-sectional views of the planarized touch panel along the lines a-a' and b-b' when the touch panel is integrated into an in-cell touch display device, where a Thin-Film Transistor (TFT) array substrate 26 is disposed opposite to the above touch panel. Generally, the color resistance insulating layer in the touch panel is formed by an array of RGB three-color color resistor units, where the color resistors in each column of the array share the same color, and the width of the color resistors in each column is the same with that of the pixel display area on the TFT array substrate, so as to ensure that the color distribution of the color resistance insulating layer is correspondently the same with the color displayed by each column of pixels on the TFT array substrate. Therefore, the color resistance insulating layer may also be used to filter light in the pixel display area of the touch display device, thus eliminating the need to dispose a color filter plate at the transparent substrate 20 of the touch panel.

As for a liquid crystal display device, a liquid crystal layer (not shown) is further disposed between the touch panel and the TFT array substrate. Since different rotations of liquid crystal molecules caused by different driving voltages would change a parasitic capacitance of the sensing electrode and the driving electrode with respect to ground, and hence affect the sensing effect of the sensing electrode of the touch panel, thus the distance between the liquid crystal layer and the metal bridging layer 23 in the touch panel needs to be regulated, and the distance is preferably ranged from 4 μm to 6 μm, within which the change in the parasitic capacitance caused by the rotations of the liquid crystal molecules is minimal, and the distance can be regulated by setting the thickness of the planarization layer 25.

Generally, an alignment layer (not shown), which is made of polyimide, is coated between the planarization layer 25 and the liquid crystal layer. The alignment layer is so thin that its affection on the distance between the liquid crystal layer and the metal bridging layer 23 in the touch panel may be ignored.

Figure 3A:
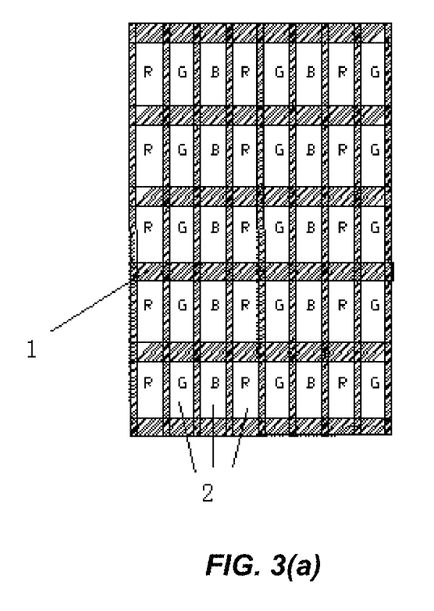
FIG. 3(a) is a distribution diagram of the black matrixes in the touch panel according to a second embodiment of the present invention.

The touch panel according to the first embodiment of the present invention further includes a black matrix layer 1 disposed between the transparent substrate and the conductive layer, where the black matrix layer is distributed between the pixel display areas as shown in FIG. 3(a), to prevent the light leakage of the touch panel employed in the display device. A color resistance cell array 2, which is used for filtering light in the pixel display area, is located within the black matrix. In addition, the black matrix 1 also shields the metal bridging region described mentioned above and as shown in FIG. 2(a)-(i), so that the disposition of the metal bridging region would not reduce the aperture ratio of the display device.

In the touch panel according to the first embodiment of the present invention, the conductive layer is transparent and includes the first conductive patterns and the second conductive patterns. The touch panel according to the present embodiment includes the black matrix layer as shown in FIG. 3(a), which is used to shield the metal bridging region.

A Second Embodiment

Figure 3B:
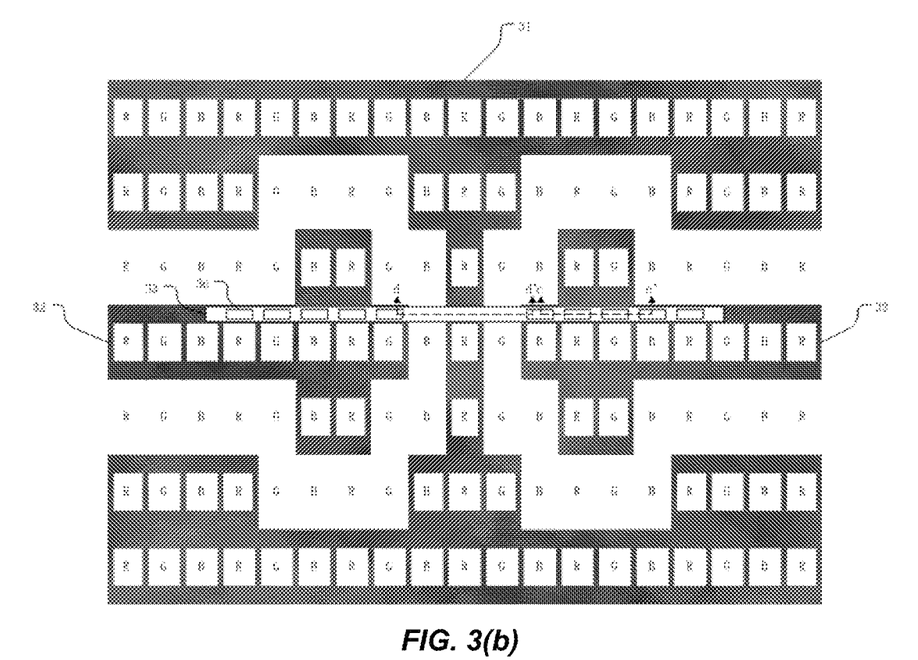
FIG. 3(b) is an enlarged schematic view of a touch unit in the touch panel according to the second embodiment of the present invention.

FIG. 3(b) is a schematic top view of a certain touch unit in the touch panel according to a second embodiment of the present invention, where the conductive layer of the touch unit shown as the black regions (31,32) is a mesh-like metal, and is shielded by the above-mentioned black matrix (as shown in FIG. 3(a)). The touch unit includes a conductive layer disposed on a transparent substrate, where the conductive layer includes a first conductive pattern 31 and second conductive patterns 32 arranged in the same layer with the first conductive pattern 31, and the first conductive pattern 31 intersects with the second conductive patterns. A color resistance insulating layer is disposed on the formed first conductive pattern 31 and second conductive patterns 32. Generally, the color resistance insulating layer is formed by an array of RGB three-color color resistor units, or in another way, by an array of black-white or RGBW color resistor units, it is not construed as limitation of the present invention. The second conductive patterns 32 located at both sides of the first conductive pattern 31 are connected together through a metal bridging layer 33. The color resistance insulating layer needs to be formed in a metal bridging region which is located within the shielded region at the black matrix layer. The color resistance insulating layer of the metal bridging region may be individually formed in a shielded region of the black matrix between color resistor units, or be simultaneously formed when the color resistor unit array is disposed. The color resistance insulating layer of the metal bridging region is etched to form through-holes 36, and the strip-like metal bridging layer 33 is disposed on the color resistance insulating layer of the metal bridging region along the through-holes 36 where the metal bridging layer 33 contacts with the second conductive pattern 32, so that the second conductive patterns 32 located at both sides of the first conductive pattern 31 are connected with each other.

Figure 3C:
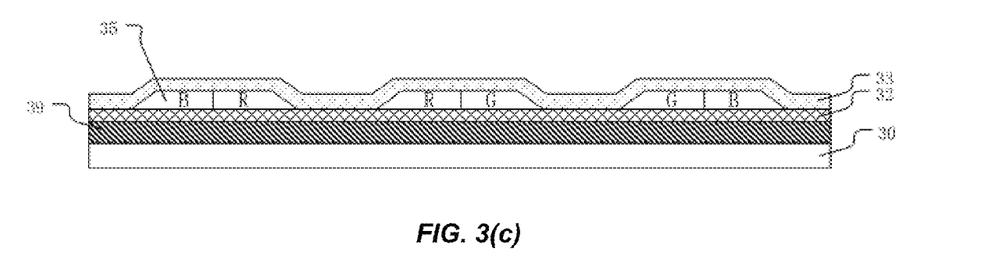
FIG. 3(c) is a cross-sectional view of the touch unit along a line c-c' in FIG. 3(b)
Figure 3D:
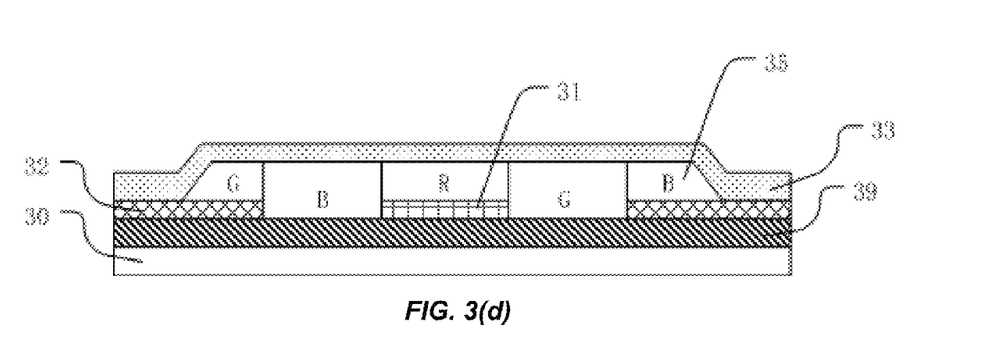
FIG. 3(d) is a cross-sectional view of the touch unit along a line d-d' in FIG. 3(b)

FIG. 3(c) is a cross-sectional view of the touch unit along a line c-c' in FIG. 3(b), and the touch unit includes a transparent substrate 30; a conductive layer disposed on the transparent substrate 30, and the conductive layer may be a second conductive pattern 32 formed along the line c-c' in FIG. 3(a); a color resistance insulating layer 35 disposed on the conductive layer, where the color resistance insulating layer 35 is etched to form a plurality of through-holes to expose the second conductive pattern 32 of the conductive layer; and a metal bridging layer 33 disposed on the color resistance insulating layer 35, where the metal bridging layer 33 is contacted with the second conductive pattern 32 of the conductive layer via the through-holes. The touch unit further includes a black matrix layer 39 disposed between the transparent substrate 30 and the second conductive pattern 32 of the conductive layer, and the metal bridging region where the metal bridging layer 33 is formed is shielded by the black matrix layer 39. FIG. 3(d) is a cross-sectional view of the touch unit along a line d-d' in FIG. 3(b), and the touch unit includes a transparent substrate 30 and a conductive layer disposed on the transparent substrate, the conductive layer is formed to be a first conductive pattern 31 and a second conductive pattern 32 along the line d-d', and the second conductive pattern 32 is separated by the first conductive pattern 31 into two segments which are connected together through a metal bridging layer 33. The color resistance insulting layer 35 in the metal bridging region insulates the metal bridging layer 33 from the first conductive pattern 31. The touch unit further includes a black matrix layer 39 disposed between the transparent substrate 30 and the second conductive pattern 32 of the conductive layer.

It should be noted that the color resistance insulating layer in the metal bridging region is not limited to the constitution form of the color resistor unit as shown in FIGS. 3(c) and 3(d), but may consist of one or more color resistor units, and the color of the color resistor unit may also be free to selected.

Figure 3E:
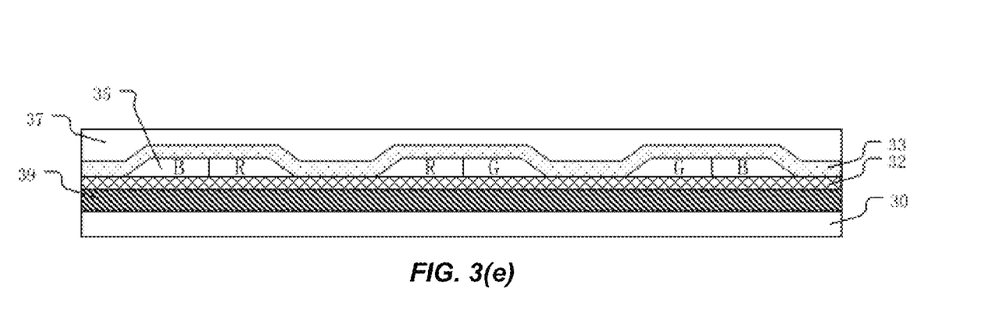
FIG. 3(e) is a cross-sectional view of the touch unit along the line c-c' in FIG. 3(b) after the planarization of the touch unit.
Figure 3F:
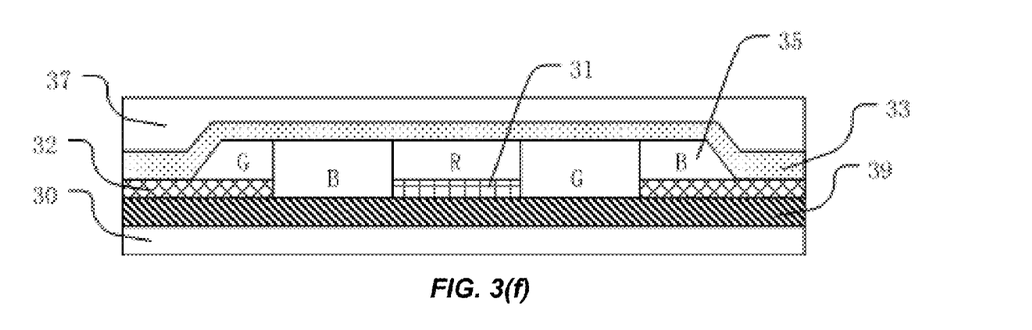
FIG. 3(f) is a cross-sectional view of the touch unit along the line d-d' in FIG. 3(b) after the planarization of the touch unit.
Figure 3G:
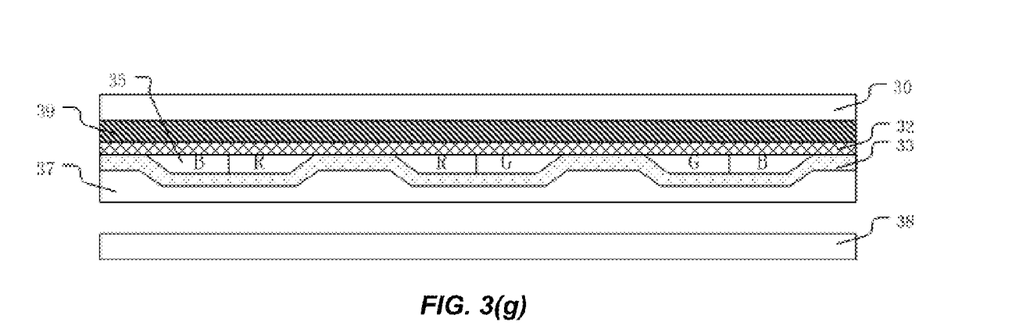
FIG. 3(g) is a cross-sectional view of the touch unit along the line c-c' in FIG. 3(b) after the touch unit is integrated into an in-cell touch display device.
Figure 3H:
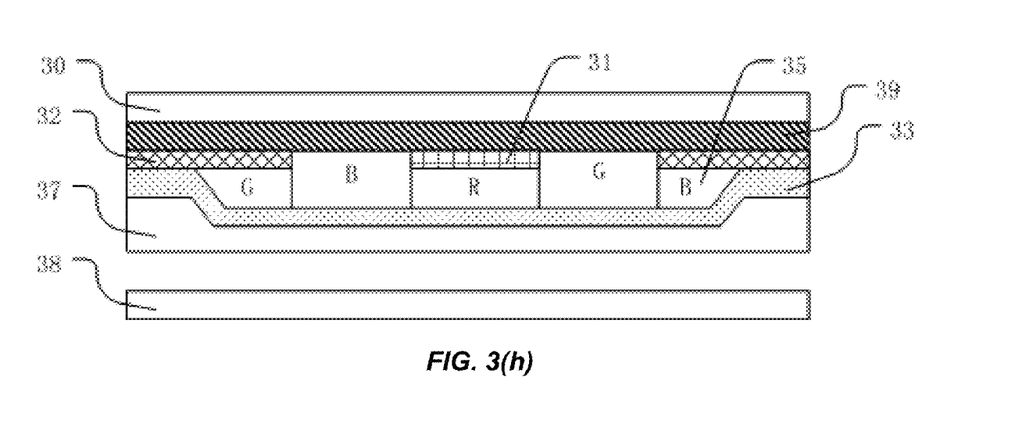
FIG. 3(h) is a cross-sectional view of the touch unit along the line d-d' in FIG. 3(b) after the touch unit is integrated into an in-cell touch display device.
Figure 4A:
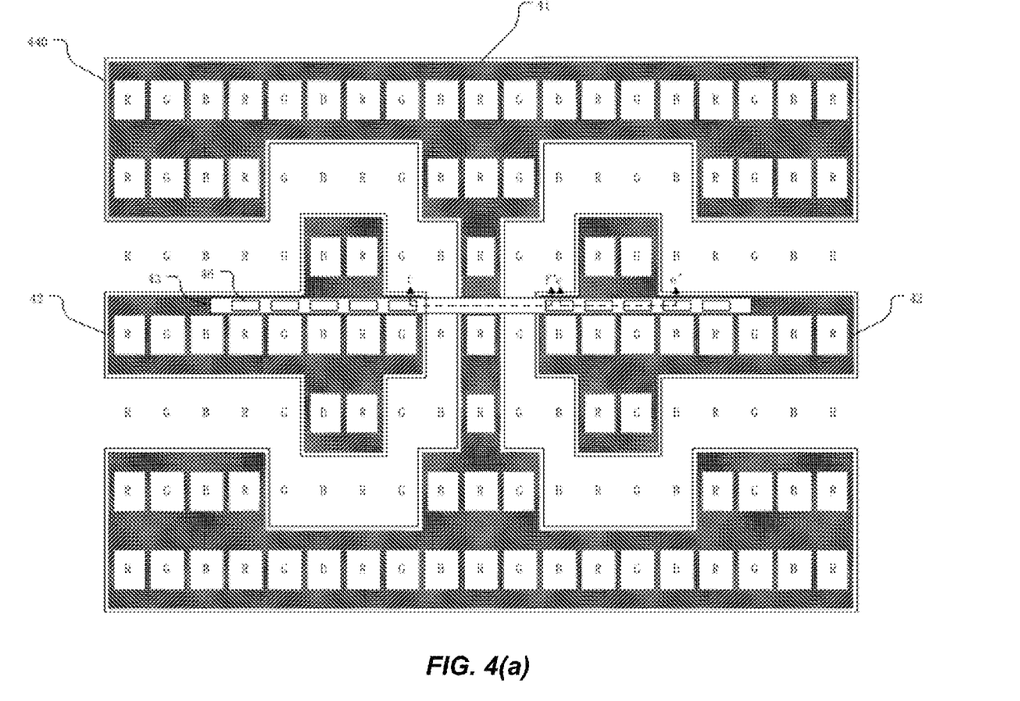
FIG. 4(a) is an enlarged schematic view of a touch unit in the touch panel according to a third embodiment of the present invention.
Figure 4B:
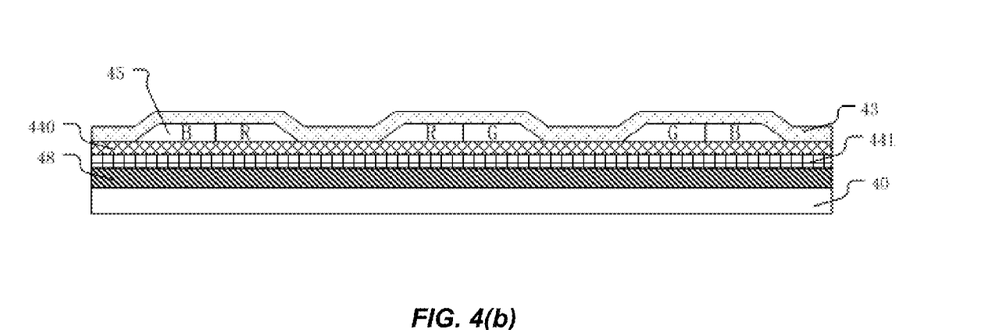
FIG. 4(b) is a cross-sectional view of the touch unit along a line e-e' in FIG. 4(a)
Figure 4C:
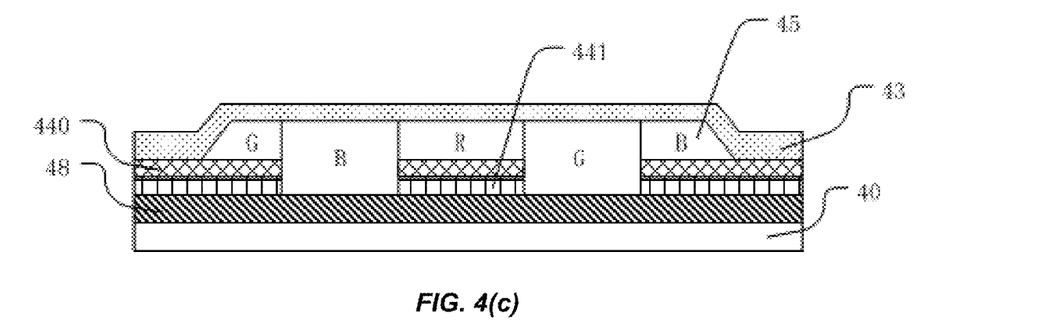
FIG. 4(c) is a cross-sectional view of the touch unit along a line f-f in FIG. 4(a)
Figure 4D:
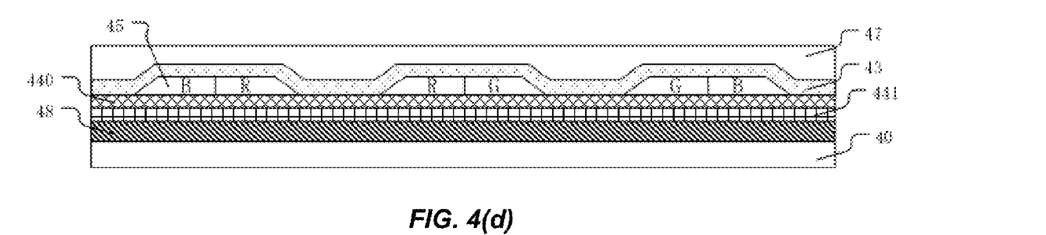
FIG. 4(d) is a cross-sectional view of the touch unit along the line e-e' in FIG. 4(a) after the planarization of the touch unit.
Figure 4E:
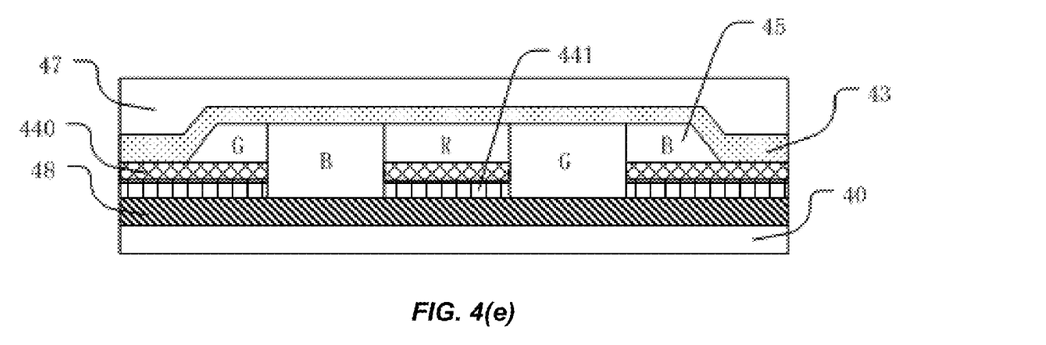
FIG. 4(e) is a cross-sectional view of the touch unit along the line f-f in FIG. 4(a) after the planarization of the touch unit.
Figure 4F:
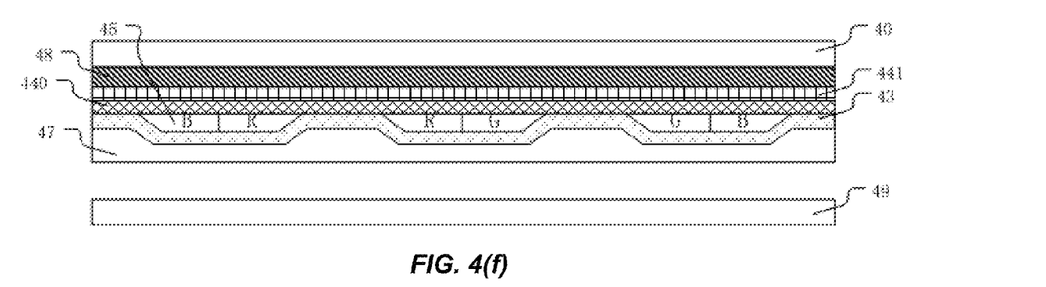
FIG. 4(f) is a cross-sectional view of the touch unit along the line e-e' in FIG. 4(a) after the touch unit is integrated into an in-cell touch display device.
Figure 4G:
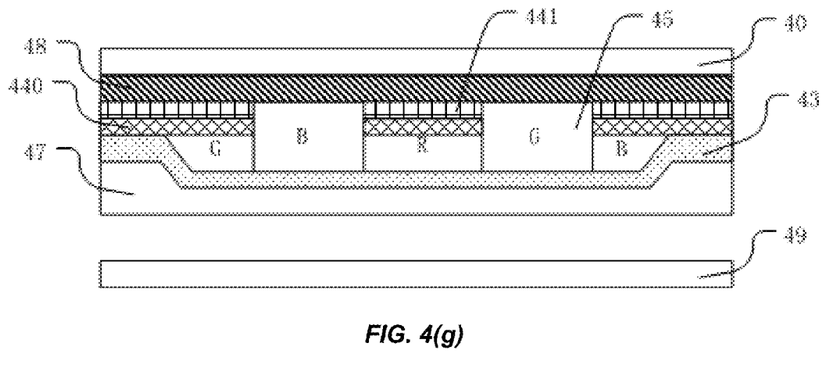
FIG. 4(g) is a cross-sectional view of the touch unit along the line f-f in FIG. 4(a) after the touch unit is integrated into an in-cell touch display device.

Generally, when the touch panel is in use, a planarization layer needs to be disposed on each touch unit as shown in FIG. 3(b). FIGS. 3(e) and 3(f) are cross-sectional views of the touch unit along the lines c-c' and d-d' after the planarization layer is disposed, respectively. The surface of the color resistance insulating layer, on which the strip-like metal bridging layer is formed, is planarized by means of the planarization layer 37 as shown. FIGS. 3(*g*) and 3(*h*) are cross-sectional views of the planarized touch panel along the lines c-c' and d-d' when the touch panel is integrated into an in-cell touch display device, respectively, where the touch panel is disposed opposite to a TFT array substrate 38. As for a liquid crystal display device, a liquid crystal layer (not shown) disposed between the TFT array substrate 38 and the touch panel is included.

In the present embodiment, the conductive layer may be a mesh-like metal layer, which is used for forming the first conductive pattern 31 and the second conductive pattern 32, and the first and second conductive patterns formed by the mesh-like metal layer are shielded by the black matrix layer 39.

In the touch panel according to the second embodiment of the present invention, the conductive layer may be the mesh-like metal layer and includes the first conductive pattern and the second conductive pattern. The touch panel according to the second embodiment of the present invention also includes the black matrix layer as shown in FIG. 3(*a*), which is used to shield the mesh-like metal layer and the metal bridging region.

A Third Embodiment

FIG. 4(*a*) is a schematic top view of a touch unit in the touch panel according to a third embodiment of the present invention, where a conductive layer of the touch unit is formed by laminating a mesh-like metal layer and a transparent conductive layer (the order for the laminating may be reversed), and is shielded by a black matrix; a black region is a region covered by the mesh-like metal layer. That is, the mesh-like metal layer of the conductive layer is located within the region shielded by the black matrix, and the contour 440 of the transparent conductive layer laminated to the mesh-like metal layer surrounds the formed conductive pattern, as shown. The conductive layer disposed on a transparent substrate in the touch unit includes a first conductive pattern 41 and a second conductive pattern 42, both of which include a structure of the laminated mesh-like metal layer and transparent conductive layer, where the first conductive pattern 41 is arranged to be intersected with the second conductive pattern 42. A color resistance insulating layer is disposed after the first conductive pattern 41 and the second conductive patterns 42 are disposed. Generally, the color resistance insulating layer is formed by an array of the RGB three-color color resistor units, or in another way, by an array of the black-white or RGBW color resistor units, it is not construed as limitation of the present invention. The second conductive patterns 42 located at both sides of the first conductive pattern 41 are connected together through a metal bridging layer 43. It's needful to dispose the color resistance insulating layer in a metal bridging region which is located within the shielded region of the black matrix layer. The color resistance insulating layer in the metal bridging region may be individually formed in a shielded region of the black matrix between color resistor units, or be simultaneously disposed when the color resistor units array is disposed. The color resistance insulating layer in the metal bridging region is etched to form through-holes 46. The strip-like metal bridging layer 43 is disposed on the color resistance insulating layer of the metal bridging region along the through-holes 46 where the metal bridging layer 43 contacts with the second conductive pattern 42, so that the second conductive patterns 42 located at both sides of the first conductive pattern 41 are connected with each other.

FIG. 4(*b*) is a cross-sectional view of the touch unit along a line e-e' in FIG. 4(*a*), and the touch unit includes a transparent substrate 40; a conductive layer disposed on the transparent substrate 40, and the conductive layer includes a transparent conductive layer 440 and a mesh-like metal layer 441 laminated to the transparent conductive layer 440; a color resistance insulating layer 45 disposed on the conductive layer, where the color resistance insulating layer 45 is etched to form a plurality of through-holes to expose the second conductive pattern 42 of the conductive layer; a metal bridging layer 43 disposed on the color resistance insulating layer 45, where the metal bridging layer 43 is contacted with the second conductive pattern 42 of the conductive layer via the through-holes; and a black matrix layer 48 disposed between the transparent substrate 40 and the mesh-like metal layer 441, where the black matrix layer 48 is used to shield the mesh-like metal layer 441 and the metal bridging layer 43. FIG. 4(*c*) is a cross-sectional view of the touch unit along a line f-f in FIG. 4(*a*), and the touch unit includes a transparent substrate 40 and a conductive layer disposed on the transparent substrate, where the conductive layer includes a mesh-like metal layer 441 and a transparent conductive layer 440 laminated to the mesh-like metal layer. The second conductive pattern is separated by the first conductive pattern into two segments which are connected together through a metal bridging layer 43. A color resistance insulting layer 45 in the metal bridging region insulates the metal bridging layer 43 from the transparent conductive layer 440 and the mesh-like metal layer 441 forming the first conductive pattern. The touch unit further includes a black matrix layer 48 disposed between the transparent substrate 40 and the mesh-like metal layer 441. For the use of the touch panel, a planarization layer needs to be disposed on each touch unit as shown in FIG. 4(*a*). FIGS. 4(*d*) and 4(*e*) are cross-sectional views of the touch unit along the lines c-c' and d-d' after the planarization layer is disposed, respectively. The surface of the color resistance insulating layer, on which the strip-like metal bridging layer is disposed, is planarized by means of the planarization layer 47 as shown. FIGS. 4(*f*) and 4(*g*) are cross-sectional views of the planarized touch unit along the lines e-e' and f-f when the touch panel is integrated into an in-cell touch display device, respectively, where the touch panel is disposed opposite to a TFT array substrate 49. As for a liquid crystal display device, a liquid crystal layer (not shown) disposed between the TFT array substrate 49 and touch panel is included.

In the touch panel according to the third embodiment of the present invention, the conductive layer includes the transparent conductive layer and the mesh-like metal layer laminated to the transparent conductive layer. The touch panel according to the third embodiment of the present invention also includes the black matrix layer as shown in FIG. 3(*a*), which is used to shield the mesh-like metal layer and the metal bridging region.

With the technical solutions of the present invention, the color resistor is used as the insulating layer to replace the existing organic film layer, thus avoiding the undesirable risk brought about by the manufacturing process for the organic film, simplifying the manufacturing process and reducing the production costs.

The preferred embodiments of the present invention are described as above, but not intended to limit the present invention. Within the technical scope disclosed in the present invention, any modifications, equivalent substitutions, etc., made by those skilled in the art, should fall into the scope of protection of the present invention. Accordingly, the scope of the protection of the present invention should be subject to the appended claims.

What is claimed is:

1. A touch panel, comprising:
a transparent substrate;
a conductive layer disposed on the transparent substrate, wherein the conductive layer comprises a plurality of first conductive patterns and a plurality of second conductive patterns intersecting with the plurality of first conductive patterns, and each of the second conductive patterns is separated into multiple segments by the plurality of first conductive patterns;
a color resistance insulating layer disposed on the conductive layer, wherein the color resistance insulating layer comprises a plurality of through-holes; and
a metal bridging layer disposed on the color resistance insulating layer, wherein the multiple segments of the second conductive pattern are connected together by the metal bridging layer via the through-holes.

2. The touch panel of claim 1, wherein the touch panel further comprises a black matrix layer disposed between the transparent substrate and the conductive layer.

3. The touch panel of claim 2, wherein the conductive layer comprises a mesh-like metal layer shielded by the black matrix layer.

4. The touch panel of claim 3, wherein the conductive layer further comprises a transparent conductive layer laminated to the mesh-like metal layer.

5. The touch panel of claim 4, wherein the transparent conductive layer is formed by ITO or IZO.

6. The touch panel of claim 1, wherein the touch panel further comprises a planarization layer disposed on the metal bridging layer.

7. The touch panel of claim 1, wherein the first conductive pattern is a driving electrode, and the second conductive pattern is a sensing electrode.

8. The touch panel of claim 1, wherein the first conductive pattern is a sensing electrode, and the second conductive pattern is a driving electrode.

9. A touch display device, comprising:
a TFT array substrate; and
a touch panel disposed opposite to the TFT array substrate, wherein the touch panel comprises:
a transparent substrate;
a conductive layer disposed on the transparent substrate, wherein the conductive layer comprises a plurality of first conductive patterns and a plurality of second conductive patterns intersecting with the plurality of first conductive patterns, and each of the second conductive patterns is separated into multiple segments by the plurality of first conductive patterns;
a color resistance insulating layer disposed on the conductive layer, wherein the color resistance insulating layer comprises a plurality of through-holes; and
a metal bridging layer disposed on the color resistance insulating layer, wherein the multiple segments of the second conductive pattern are connected together by the metal bridging layer via the through-holes.

10. The touch display device of claim 9, wherein the touch panel further comprises a black matrix layer disposed between the transparent substrate and the conductive layer.

11. The touch display device of claim 10, wherein the conductive layer comprises a mesh-like metal layer shielded by the black matrix layer.

12. The touch display device of claim 11, wherein the conductive layer further comprises a transparent conductive layer laminated to the mesh-like metal layer.

13. The touch display device of claim 9, wherein the touch panel further comprises a planarization layer disposed on the metal bridging layer.

14. The touch display device of claim 13, wherein an alignment layer is coated between the planarization layer and a liquid crystal layer, wherein the alignment layer is made of polyimide.

15. The touch display device of claim 14, wherein the liquid crystal layer is disposed between the TFT array substrate and the touch panel.

* * * * *